(No Model.)
G. S. SHEFFIELD.
HAND CAR.
No. 264,481. Patented Sept. 19, 1882.
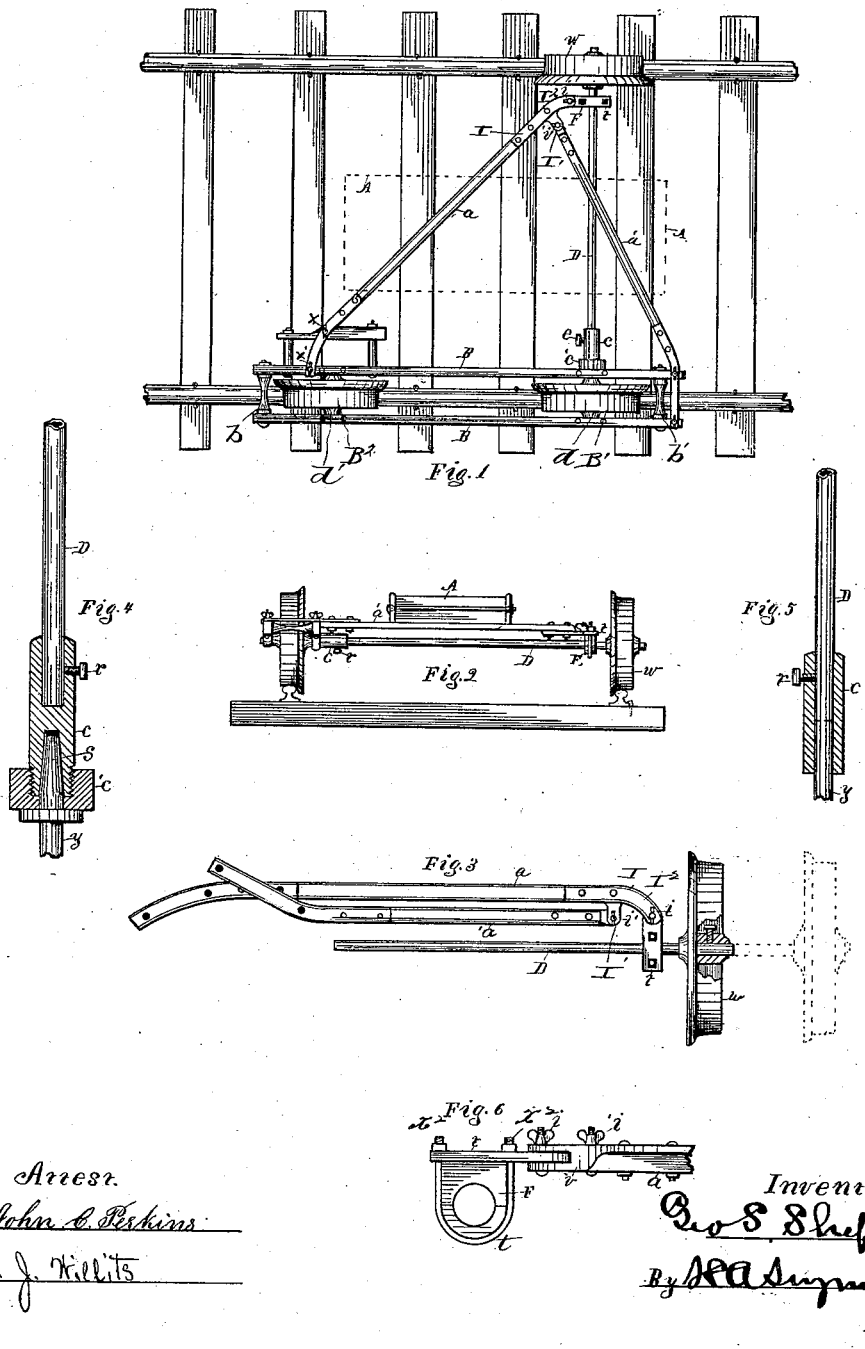
Attest.
John C. Perkins
W. J. Willits
Inventor.
Geo. S. Sheffield
By [signature]
Atty.

UNITED STATES PATENT OFFICE.

GEORGE S. SHEFFIELD, OF THREE RIVERS, MICHIGAN, ASSIGNOR TO THE SHEFFIELD VELOCIPEDE CAR COMPANY, OF SAME PLACE.

HAND-CAR.

SPECIFICATION forming part of Letters Patent No. 264,481, dated September 19, 1882.

Application filed June 15, 1882. (No model.)

*To all whom it may concern:*

Be it known that I, GEORGE S. SHEFFIELD, of Three Rivers, in the county of St. Joseph and State of Michigan, have invented certain new and useful Improvements in Three-Wheel Hand-Cars; and I do hereby declare the following to be a full, clear, and exact description of the invention, such as will enable others skilled in the art to which it pertains to make and use the same.

My invention relates to three-wheel hand-cars; and it consists in certain features of construction and combinations of parts, as will hereinafter be explained, and pointed out in the claims.

In the accompanying drawings, Figure 1 is a plan view of our improved car, the tool-receptacle being shown in dotted lines. Fig. 2 is a front elevation of the same with the tool-box in position. Fig. 3 illustrates the guide-wheel axle and the supporting-braces detached from the main frame and folded for transportation. Figs. 4 and 5 represent the manner of attaching the guide-wheel axle to the axle of the forward main wheel. Fig. 6 is a detached view of the axle-bearing, illustrating its connection with the rear diagonal brace.

The main frame of the car preferably consists of two parallel longitudinal bars, B B, and cross-bars $b\ b'$.

B′ represents the forward main wheel, and B² the main rear wheel of the car, mounted on axles $d\ d'$. These wheels may be operated in any preferred manner, no propelling devices being here shown; but I prefer to employ the propelling mechanism shown and claimed in my application for Letters Patent filed March 1, 1882. The axle $d$ of the forward driving-wheel, B′, extends inwardly beyond the main frame to form a collar, C, and sleeve $c$, which latter is adapted to receive the inner end of the axle D of the guide-wheel, and is provided with a thumb-screw, $e$, to secure said axle D within the sleeve.

Upon the outer end of the axle D is rigidly mounted the guide-wheel $w$ in any desired manner; but I prefer to secure the wheel by a collar and screw, as shown in section in Fig. 3.

X represents a supplemental frame projecting inwardly from the rear end of the main frame. Upon this frame X and the adjacent bar of the main frame is removably secured by thumb-screws $x\ x$ the rear end of a diagonal brace, $a$, the forward end of which is provided with a metallic strap or plate, I. The latter is provided with a laterally-projecting perforated lug, I′, and a forward perforated and slotted end, I². To the lug I is pivotally secured the outer end of a forward diagonal brace, $a'$, the opposite end of the latter being bent for its removable attachment to the forward end of the main frame.

F represents a pendent bearing for the axle D, supported by a U-shaped bolt, whose ends project through a metallic strap, $t'$, and are secured by nuts $t^2$. One end of the strap $t'$ projects rearwardly and is pivotally and removably secured within a slot of the forward end of the strap I², adjacent to the guide-wheel. The bearing as thus constructed and arranged fully supports the outer end of the axle D, and serves as a convenient connecting device for the diagonal braces of the car and the axle.

A represents a box adapted to be removably supported upon the braces $a$ and $a''$ to receive tools, &c.

When it is desired to transport the car the box A is removed and braces $a$ and $a'$ and axle D are disconnected from the main frame and folded together, as shown in Fig. 3, the brace $a$ freely turning on the pivot $i$, which secures it to the bearing F of the axle, and the brace $a'$ upon its pivot $i'$.

I do not limit myself to any particular means for securing the guide-wheel axle to the axle of the forward driving-wheel. In Fig. 4 is represented one manner of connecting these parts, consisting in the employment of an internally-threaded collar, $c'$, secured upon the spindle S of the axle $y$, and a double coupling-sleeve, $c$, threaded to be screwed into said collar, the axle D being held within the inner end of the sleeve by a nut, $r$. In Fig. 5 is shown a coupling-sleeve, $c$, secured upon the inner end of the axle $y$, and adapted to receive the end of the axle D, which is secured thereto by a nut, $r$.

Many other alterations in the details of construction may be resorted to without departing from the spirit of my invention. Hence I would have it understood that I do not limit myself to the precise construction shown and described, but reserve the right to make such changes in form and construction as may fairly fall with the spirit and scope of my invention.

Having thus described my invention, what I claim as new, and desire to secure by Letters Patent, is—

1. In a three-wheel hand-car, the combination, with the main frame and an axle having a guide-wheel journaled on its outer end, said axle being detachably secured at its inner end to the axle of one of the main wheels, of braces connected at one end to the main frame, and provided with a bearing for the axle at a point near the guide-wheel, substantially as set forth.

2. In a three-wheel hand-car, the combination, with an axle supporting a guide-wheel at one end and one of the main wheels at its opposite end, of a brace or braces attached to the main frame and an axle box or bearing located near the guide-wheel and adapted to support the outer end of said axle, substantially as set forth.

3. In a three-wheel hand-car, the combination, with the main frame, of a guide-wheel mounted on an axle removably secured to the axle of the forward driving-wheel, a rear diagonal brace removably secured at one end to the rear end of the frame, its opposite end being pivotally attached to a pendent bearing for the guide-wheel axle, and a forward diagonal brace removably secured at one end to the forward end of the frame and pivotally attached to the rear brace, substantially as and for the purpose set forth.

4. In a three-wheel hand-car, the combination, with the forward axle projecting inwardly beyond the main frame, of a guide-wheel axle and devices for removably securing the latter to the projecting end of the axle of the forward driving-wheel, substantially as and for the purpose set forth.

5. In a three-wheel hand-car, the combination, with the main frame and diagonal braces for supporting a tool-box, of a guide-wheel axle removably secured to the axle of the forward driving-wheel to turn therewith, and supported adjacent to the guide-wheel in a pendent bearing pivotally connected to the forward end of the rear brace, substantially as and for the purpose set forth.

6. In a three-wheel hand-car, the combination, with the main frame having an inwardly projecting supplemental frame, of a forward and a rear diagonal brace, said braces being removably secured respectively to the forward and rear ends of the main frame, and pivotally secured together to admit of their being folded, a pendent bearing pivotally secured to the forward end of the rear brace, and a guide-wheel axle removably secured at its inner end to the axle of the forward driving-wheel and supported at its outer end in said pendent bearing, substantially as and for the purpose set forth.

In testimony whereof I have signed this specification in the presence of two subscribing witnesses.

GEORGE SOLYMAN SHEFFIELD.

Witnesses:
ALBERT C. TITUS,
EDWARD B. LINSLEY.